Patented Sept. 2, 1952

2,609,403

UNITED STATES PATENT OFFICE 2,609,403

MANUFACTURE OF STYRENE COMPOUNDS

Francis Edward Salt, Banstead, William Webster, Epsom, England, and Eugen Galitzenstein, deceased, late of London, England, by Gertrud Galitzenstein, legal representative, Wallington, England, assignors to The Distillers Company Limited, Edinburgh, Scotland, a British company No Drawing. Application June 28, 1948, Serial No. 35,738. In Great Britain June 28, 1947

15 Claims. (Cl. 260—650)

The present invention relates to the manufacture of styrene compounds and relates in particular to the dehydrochlorination of chlorethyl benzenes and their nuclear chlor- and alkyl substituted derivatives to form styrene or styrene derivatives.

It is known from British Specification No. 356,107, that chlorethyl benzenes may be dehydrochlorinated by heating with an excess of pyridine to a temperature of between 100 and 200° C., giving pyridine hydrochloride and styrene. The preferred temperature is above 180° C. and the time for carrying out the reaction is about three hours. In British Specification No. 387,397, the dehydrohalogenation of halogenated ethyl benzene is effected by refluxing the crude undiluted material at temperatures between 155° and 175° C., in the presence of an added small amount of a catalytically acting salt of an organic base. As examples of the catalyst are enumerated salts of pyridine, dibenzyl amine, diethyl amine and aniline with hydrochloric acid, sulphuric acid, phosphoric acid and acetic acid respectively. Besides these salts others such as the salts of piperidine, pyridine, and quinoline alkaloids including quinine are mentioned, and the salts may be formed in situ.

It has now been found that the use of collidine offers many advantages over the use of those bases which have hitherto been suggested. Accordingly the novel process for the production of styrene compounds comprises heating in a reaction zone in the liquid phase a chlorethyl benzene or a nuclear chlor- and/or alkyl substituted derivatives in the presence of collidine. The collidine may be added to the chlorethyl benzene compound as such, or it may be in the form of the collidinium ion as in a salt with an acid such as hydrochloric, phosphoric or acetic acid.

The concentration of collidine may vary within wide limits, and any proportion exceeding 0.2% by weight may be employed, the dehydrochlorination rate increasing with increasing catalyst concentration under otherwise similar conditions. This is illustrated by the following table, showing the amount of hydrogen chloride split off from 50 ml. of a 30% by weight solution of a chlorethyl xylene in xylene by refluxing for 4 hours in the presence of various amounts of collidine.

| Millimols of collidine | Millimols of hydrogen chloride formed | |
|---|---|---|
| | Free | Total |
| 2 | 40.1 | 42.1 |
| 3 | 60.6 | 63.6 |
| 4 | 67.5 | 71.5 |
| 5 | 79.5 | 84.5 |
| 6 | 88.0 | 94.0 |

In the last column of this table, the total hydrogen chloride liberated includes that which combined with the collidine catalyst.

The actual amount of dehydrochlorination effected by the collidine may be greatly increased by operating continuously or, in the case of batch runs, by reusing the collidine from the previous batch. The preferred collidine or collidinium concentration for both batch and continuous runs is in the range 0.5 to 10% by weight.

The lowest temperature at which the reaction commences in the presence of collidine varies from compound to compound, but may readily be determined for each case simply by slowly increasing the temperature of the reaction mixture while blowing an inert gas such as nitrogen through the liquid and noting the first evolution of hydrogen chloride as shown by its presence in the exit gas. The upper temperature limit is fixed by the boiling point of the compound undergoing dehydrochlorination, but it is preferred to employ temperatures in the lower part of the range.

The collidine and, in particular, its hydrohalide salts often do not dissolve completely in the reaction mixture and are fused at the reaction temperature, forming a heavy layer at the bottom of the reaction vessel and, in such cases, it is essential to provide means for increasing the contact between the catalyst and the supernatant liquid. This contact may be provided in various ways, if desired, in conjunction with the continuous removal from the reaction mixture of the hydrogen chloride liberated in the course of the reaction, the continuous removal of the hydrogen chloride being advantageous as it favours the progress of the reaction and makes possible its collection and recovery. The process of the invention may, therefore, be carried out, for instance, when working at ordinary pressure by blowing an inert gas, such as nitrogen, through the reaction mixture or by refluxing the same. Since, however, the chlorinated compounds reflux at comparatively high temperatures it has been found advantageous to effect the reaction in the presence of an inert organic solvent with a lower boiling point and select the solvent and adjust its quantity in the solution in accordance with the temperature at which it is desired the reaction should be carried through. Such inert solvents, which should be liquid at normal temperature and pressure, are for instance toluene, xylene, ethyl benzene, and the like. A further means of removing the hydrogen chloride consists in refluxing the reaction mixture under reduced pressure, it being understood, of course, that the lower pressure limit is automatically fixed in any particular case by the restriction to operation in the liquid phase. In this case the boiling temperature may be reduced sufficiently to carry out the dehydrochlorination in a satisfactory manner without the use of a solvent. Other means of improving the contact between the catalyst and the chlorinated compound to be dehydrochlorinated and increasing the rate of removal from the mixture of the liberated hydrogen chloride, such as agitation, or a combination of two or more of such means may also be employed.

The chlorethyl benzene compound, which may have the chlorine atom in the alpha or beta position in the side chain, may be free from nuclear substituents, or the benzene ring may contain additional substituents such as an alkyl group or several alkyl groups as in the chlorethyl xylenes and chlorethyl cymene, or chlorine as in chlorethyl mono- or dichlorbenzene. The term "chlorethyl" is used herein generically, to refer to either the alphachlorethyl or the betachlorethyl material or their mixtures with one another.

The collidine used may be the crude product obtained from coal tar distillates and marketed as such, with a boiling range of about 150° to 185° C. and containing a mixture of alkyl derivatives of pyridine or it may be one of the components of said mixture after purification, for instance by fractional distillation. The collidine mentioned later in the examples is the crude product.

We have found that the use of collidine for the dehydrochlorination allows the reaction to be carried out at lower temperatures than when other organic bases which have hitherto been suggested, such as pyridine or di-ethyl aniline, are used. This reduction in temperature has the great advantage that the possibility of polymerisation of the styrene derivatives produced is considerably decreased.

When the dehydrochlorination with the aid of collidine as catalyst is carried out in the absence of low boiling solvents, the styrene compound may be distilled from the reaction mixture as soon as it is formed, being preferably withdrawn through a fractionating column, fitted with an offtake condenser. In this case, the use of reduced pressure is particularly advantageous as the temperature to which the styrene compound is subjected is thereby lowered.

It is advantageous to carry out the heating of the reaction mixture in an atmosphere of an inert gas such as nitrogen to prevent oxidation of the reactants or of the reaction product. A polymerisation inhibitor such as pyrogallol or hydroquinone may be present in the reaction mixture.

The following table shows the temperatures at which dehydrochlorination of a chlorethyl xylene begins when the reaction is carried out with the aid of collidine as catalyst in comparison with tests in which other bases have been used which had previously been suggested. Solutions of equal parts by weight in toluene were used. After addition of 5 molar % of the base calculated on the chlorethyl xylene the solutions were slowly heated in an oil bath until the dehydrochlorination started with the formation of hydrogen chloride gas.

*Table*

| Base used | Reaction temperature at which dehydrochlorination starts ° C. |
| --- | --- |
| Quinoline | 140.5 |
| Pyridine | 138 |
| Collidine | 127 |

The reaction according to this invention may be carried out batch wise, in a semi-continuous or in a continuous manner. In the last case it is expedient to heat the reaction mixture in a vessel fitted with a column and reflux condenser returning the reflux to the bottom of the reaction vessel, this feature assisting in the agitation of the reaction mixture. The crude chlorinated compound mixed with the collidine is heated until the reflux and the formation of hydrogen chloride begin, or have continued for some time, whereupon fresh chlorinated compound is introduced commensurate with the production of the corresponding styrene compound. The product is removed from the reaction vessel by suitable means, for instance through an overflow.

In order to effect final purification of the styrene compound formed from unreacted chlorinated compound, it may be treated again by refluxing with a small quantity of collidine followed by fractionation. Any collidine present in the distillate may be washed out with water or dilute mineral acid. Alternatively, the styrene compound may be separated from the product by fractionation and the unchanged reactants recycled.

The following examples illustrate, but do not limit, the process of the invention, and show a comparison of the action of collidine with that of previously known basic catalysts.

*Example 1.*—A mixture containing equal volumes of ethyl benzene and a chlorethyl-chlorbenzene was treated with pyridine in an amount of 10% molar on the chlorethyl-chlorbenzene and the mixture was boiled under reflux at atmospheric pressure, the internal temperature being about 150° C. After 30 minutes no hydrogen chloride was evolved, and some ethyl benzene was slowly distilled off. The internal temperature rose, but even at an internal temperature of 172° C. no hydrogen chloride was evolved. The addition of more pyridine did not improve the dehydrochlorination to a material extent although pyridine hydrochloride had been formed in the heated mixture. Under the same conditions collidine caused the evolution of considerable quantities of hydrogen chloride from the chlorethyl-chlorbenzene at temperatures from 165–170° C.

*Example 2.*—To separate mixtures, each containing 5 parts by volume of α-chlorethyl-chlorbenzene and 4 parts by volume of ethyl benzene and having a boiling point of about 162° C. were added 10% molar amounts calculated on the chlorethyl-chlorbenzene, of collidine, pyridine, diethyl aniline and quinoline. The mixtures were refluxed for 15 minutes but in no case was hydrogen chloride evolved. After adding a small amount of the chlorethyl-chlorbenzene to each mixture to raise the boiling point to 165–166° C. measured in the liquid, refluxing was continued for 30 minutes. The mixture containing collidine as catalytic substance showed evolution of hydrogen chloride corresponding to 14% decomposition, but none was evolved by the mixtures containing diethyl aniline, pyridine, or quinoline.

*Example 3.*—12.0 grams of collidine hydrochloride and 1 gram of hydroquinone were placed in a 3-necked flask, carrying a short packed column, dropping funnel, thermometer and a capillary tube leading into the bottom of the flask. Nitrogen was passed through the capillary and the flask was heated in an oil bath until the internal temperature was 170–180° C. The pressure in the system was then reduced to 200 mm. Hg and while the temperature was maintained, 400 grams of alpha-chlorethyl mono-chlorbenzene containing 8 grams of collidine were added from the dropping funnel at a rate of about 100 grams per hour. Evolution of hydrogen chloride began almost immediately and chlorstyrene distilled up the column and was collected. 314.5 grams of distillate were obtained, containing 176 grams of chlorstyrene and 138.5 grams of the chlorethyl chlorbenzene, representing an efficiency of 85% at a conversion of 65.4%.

*Example 4.*—To a solution of 50 parts by weight of a distilled chlorethyl xylene in 50 parts by weight of toluene, containing 0.3% by weight of pyrogallol, were added 5 parts by weight of collidine. The mixture was heated and refluxed for 2½ hours at ordinary pressure, after which the solvent toluene was removed by distillation at a pressure of 100 mm. Hg followed by the vinyl xylene at a pressure of 4 mm. Hg. The residue containing unreacted chlorethyl xylene was then made up to the original volume by adding further chlorethyl xylene solution in toluene and the process was repeated. After three such stages of dehydrochlorination had been carried out the collected vinyl xylene was distilled at 12–15 mm. Hg. The yield of vinyl xylene produced calculated on the chlorethyl xylene decomposed was 90.5%. 2.5% of chlorethyl xylene was recovered whilst 7% of the product was a resinous residue.

*Example 5.*—150 cc. of crude chlorethyl xylene containing 2 parts by volume of xylene and one part by volume of a chlorethyl xylene were charged into a reaction vessel with 15 cc. of collidine. The reaction vessel which was heated in an oil bath was connected to a column leading to a reflux condenser fitted with an outlet for hydrogen chloride and the liquid from the column base was returned to the bottom of the reaction vessel. On heating, the formation of hydrogen chloride gas began soon after the reflux started. Crude chlorethyl xylene was then introduced into the reaction vessel at an average rate of 117 cc. per hour for a period of 6¾ hours, the product being continuously removed through an overflow, after which the reaction product obtained was separated from the lower catalyst layer by decantation and was fractionated to give a cut containing 98.7% of vinyl xylene in an amount corresponding to 86% dehydrochlorination of the total chlorethyl xylene charged and a production of 25 grams of vinyl xylene per hour.

In the following claims, the term "collidine" is to be understood as including the equivalent collidinium ion. By "styrene compound" is meant styrene and its nuclear chlor- and/or alkyl-substituted derivatives.

We claim:

1. A process for the production of a styrene compound, comprising heating in a reaction zone in the liquid phase a compound selected from the group consisting of chlorethyl benzenes and their nuclear chlor-substituted and alkyl-substituted derivatives in the presence of collidine in a concentration exceeding 0.2% by weight at a temperature between the lowest at which dehydrochlorination takes place and the boiling point of the chlorethyl compound.

2. A process as set forth in claim 1, wherein the collidine is present in a concentration in the range 0.5% to 10% by weight.

3. A process set forth as in claim 1, wherein the chlorethyl compound and the collidine are agitated together in the reaction zone.

4. A process set forth as in claim 1, wherein the hydrogen chloride formed is continuously removed from the reaction zone.

5. A process as set forth in claim 1, wherein the mixture in the reaction zone is continuously boiled and refluxed.

6. A process as set forth in claim 1, wherein the mixture in the reaction zone is continuously boiled and refluxed, and the product is continuously withdrawn as a distillate.

7. A process as set forth in claim 1, wherein the mixture in the reaction zone is continuously boiled and refluxed, and the product is continuously withdrawn as distillate, the pressure in the reaction zone being maintained below atmospheric but above that under which the reaction mixture boils at the lowest temperature specified.

8. A process as set forth in claim 1, wherein an inert solvent which is normally liquid and which boils at a temperature lower than does the chlorethylbenzene compound present in the reaction mixture is incorporated therein, and the reaction mixture is continuously boiled and refluxed.

9. A process as set forth in claim 1, wherein an inert gas is passed through the reaction mixture.

10. A process as set forth in claim 1, wherein a polymerisation inhibitor for the formed styrene compound is incorporated in the reaction mixture.

11. A process as set forth in claim 1, when carried out in an atmosphere of an inert gas.

12. A process as set forth in claim 1, wherein the addition of the chlorethyl benzene to, and the removal of the product from, the reaction zone is carried out continuously.

13. A process as set forth in claim 1, wherein said compound is a chlorethyl benzene.

14. A process as set forth in claim 1, wherein said compound is a chlorethyl xylene.

15. A process as set forth in claim 1, wherein said compound is a chlorethyl chlorbenzene.

FRANCIS EDWARD SALT.
WILLIAM WEBSTER.
GERTRUD GALITZENSTEIN,
*Legal Representative of Eugen Galitzenstein, Deceased.*

REFERENCES CITED

The following references are of record in the file of this patent:

UNITED STATES PATENTS

| Number | Name | Date |
|---|---|---|
| 1,870,852 | Jargstorff | Aug. 9, 1932 |
| 1,870,877 | Smith et al. | Aug. 9, 1932 |
| 1,926,314 | Smith | Sept. 12, 1933 |

FOREIGN PATENTS

| Number | Country | Date |
|---|---|---|
| 396,079 | Great Britain | July 28, 1933 |
| 659,880 | Germany | May 12, 1938 |
| 518,685 | Great Britain | Mar. 5, 1940 |